(12) United States Patent
Howard et al.

(10) Patent No.: US 10,130,882 B2
(45) Date of Patent: *Nov. 20, 2018

(54) TOUCH SCREEN WITH VIRTUAL JOYSTICK AND METHODS FOR USE THEREWITH

(71) Applicants: John W. Howard, Cedar Park, TX (US); Brian G. Howard, Cedar Park, TX (US); Jeremy R. Howa, Round Rock, TX (US)

(72) Inventors: John W. Howard, Cedar Park, TX (US); Brian G. Howard, Cedar Park, TX (US); Jeremy R. Howa, Round Rock, TX (US)

( * ) Notice: Subject to any disclaimer, the term of this patent is extended or adjusted under 35 U.S.C. 154(b) by 443 days.

This patent is subject to a terminal disclaimer.

(21) Appl. No.: 14/984,332

(22) Filed: Dec. 30, 2015

(65) Prior Publication Data
US 2016/0220902 A1   Aug. 4, 2016

Related U.S. Application Data

(63) Continuation of application No. 12/784,293, filed on May 20, 2010, now Pat. No. 9,262,073.

(51) Int. Cl.
| | | |
|---|---|---|
| *G06F 3/041* | (2006.01) | |
| *G06F 3/0488* | (2013.01) | |
| *G06F 3/0481* | (2013.01) | |
| *A63F 13/42* | (2014.01) | |
| *A63F 13/2145* | (2014.01) | |
| *A63F 13/426* | (2014.01) | |
| *G06F 3/0484* | (2013.01) | |

(52) U.S. Cl.
CPC .......... *A63F 13/42* (2014.09); *A63F 13/2145* (2014.09); *A63F 13/426* (2014.09); *G06F 3/0416* (2013.01); *G06F 3/04815* (2013.01); *G06F 3/04842* (2013.01); *G06F 3/04883* (2013.01); *G06F 3/04886* (2013.01)

(58) Field of Classification Search
CPC ............................ A64F 13/2145; A64F 13/42
See application file for complete search history.

(56) References Cited

U.S. PATENT DOCUMENTS

| | | | |
|---|---|---|---|
| 6,515,689 B1 * | 2/2003 | Terashima | .......... G06F 3/04812 345/157 |
| 2002/0103031 A1 * | 8/2002 | Neveu | ..................... A63F 13/06 463/49 |

(Continued)

*Primary Examiner* — Amr Awad
*Assistant Examiner* — Stephen Bray
(74) *Attorney, Agent, or Firm* — Garlick & Markison; Bruce E. Stuckman

(57) ABSTRACT

Joystick display data is generated for display on a touch screen of an electronic device. The joystick display data creates a visual representation of a virtual joystick when displayed on the touch screen. Touch data from the touch screen is processed to determine when the touch data indicates user interaction with the virtual joystick. When the touch data indicates user interaction with the virtual joystick, the joystick display data is adjusted to reflect the user interaction with the virtual joystick, based on the touch data, and joystick data is generated based on the user interaction with the virtual joystick. The display of at least one other element on the touch screen can be adjusted based on the joystick data.

20 Claims, 17 Drawing Sheets

(56) References Cited

U.S. PATENT DOCUMENTS

2007/0265081 A1* 11/2007 Shimura ................ A63F 13/10
                                                                            463/37
2008/0309626 A1* 12/2008 Westerman .......... G06F 3/0485
                                                                           345/173

* cited by examiner

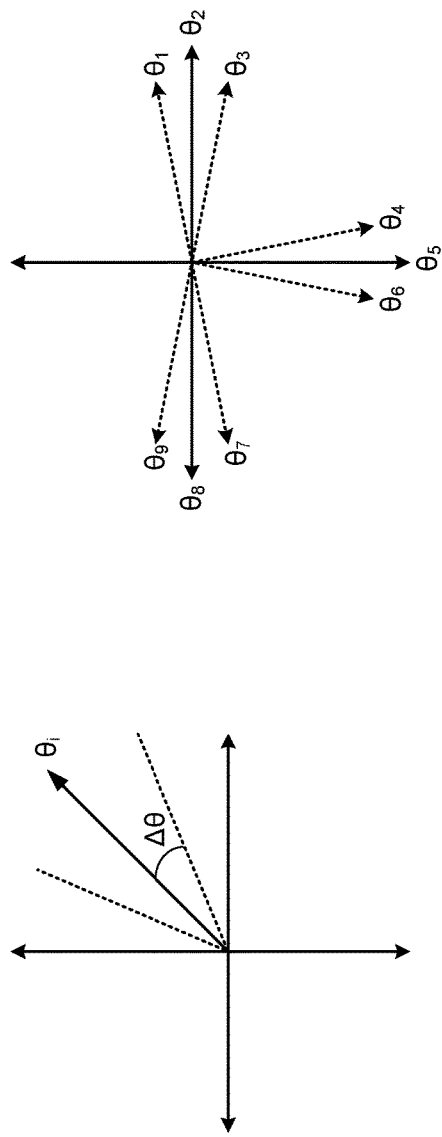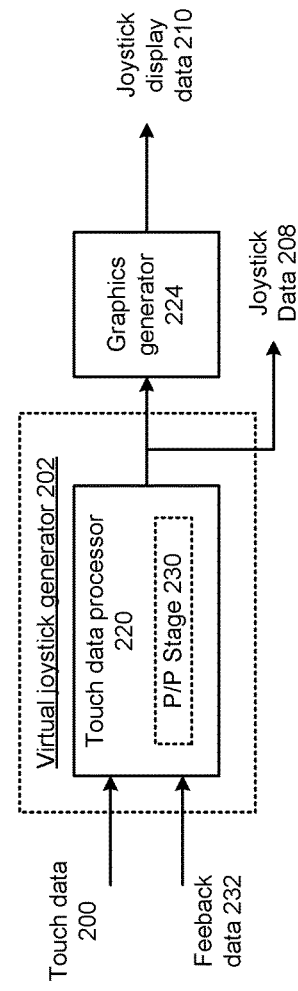

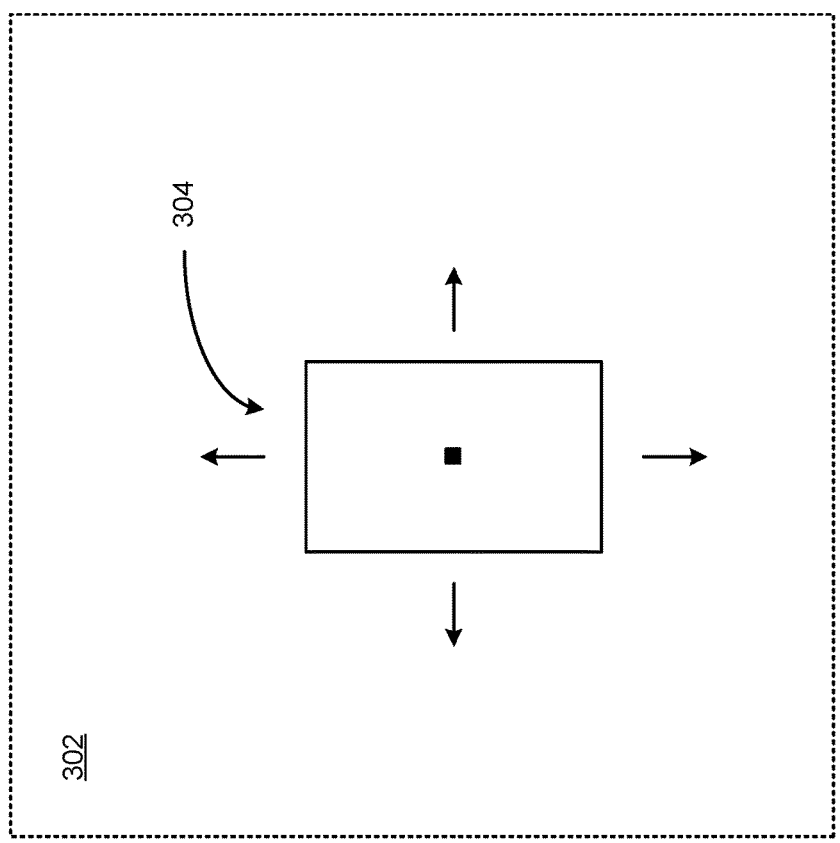

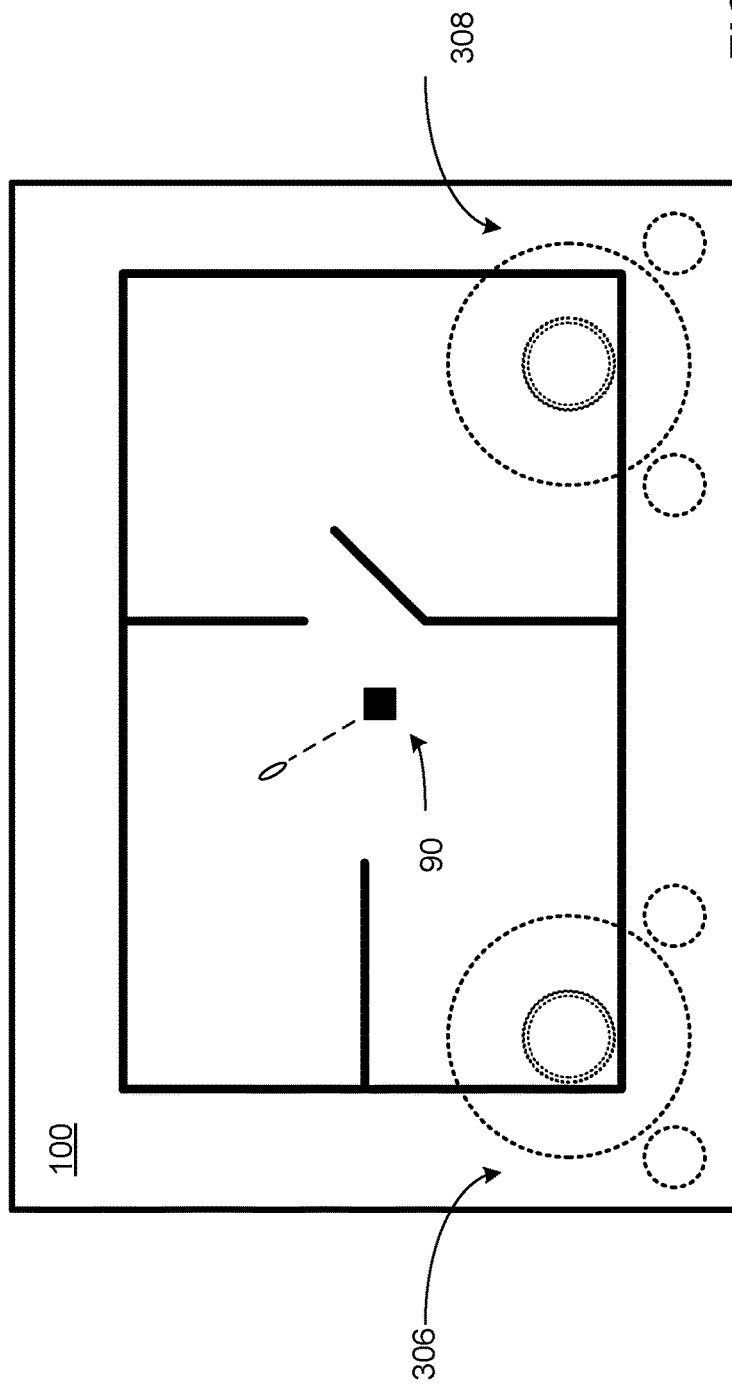

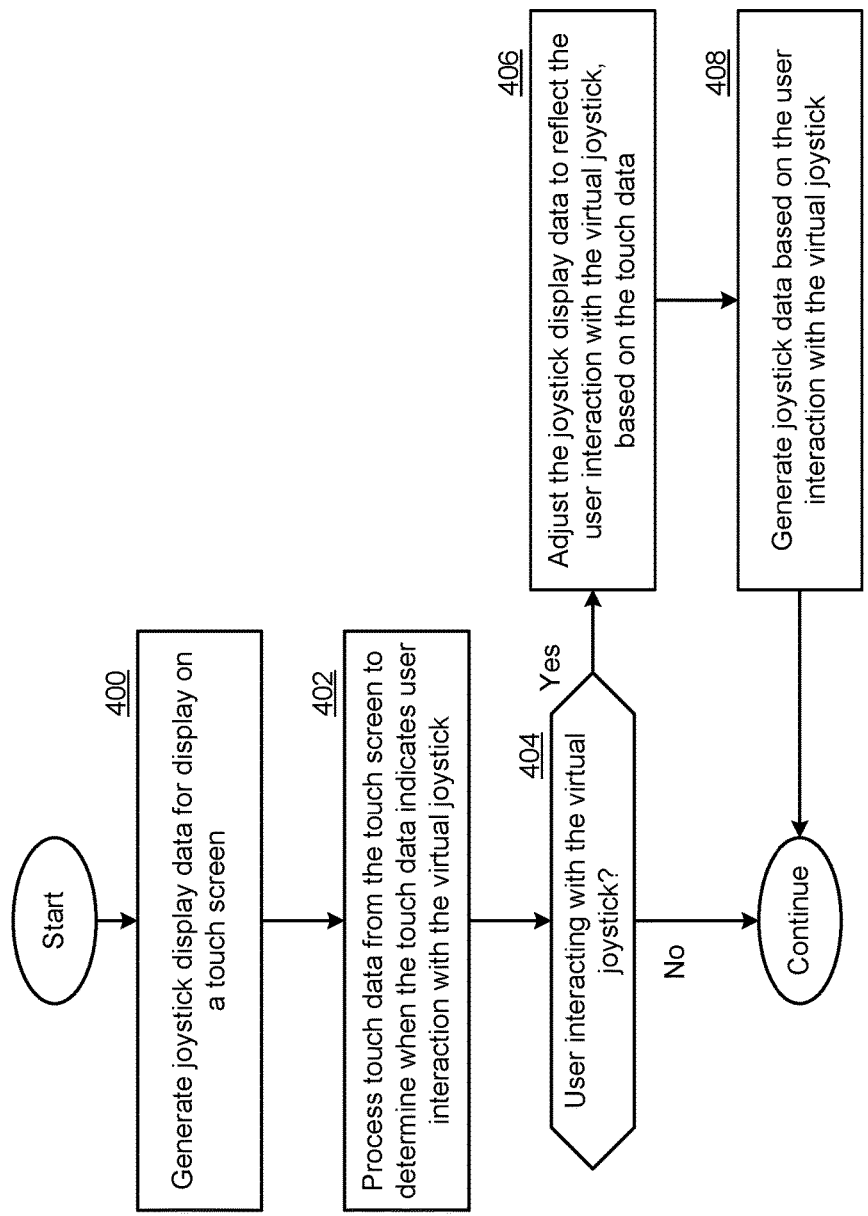

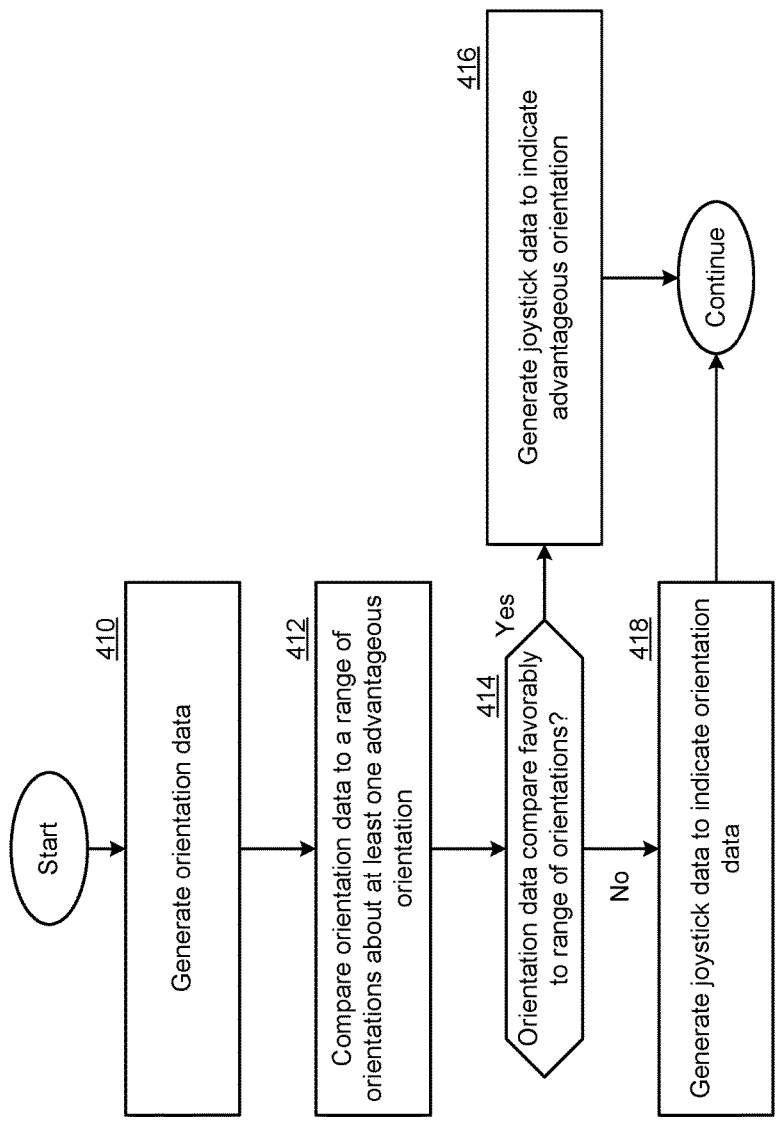

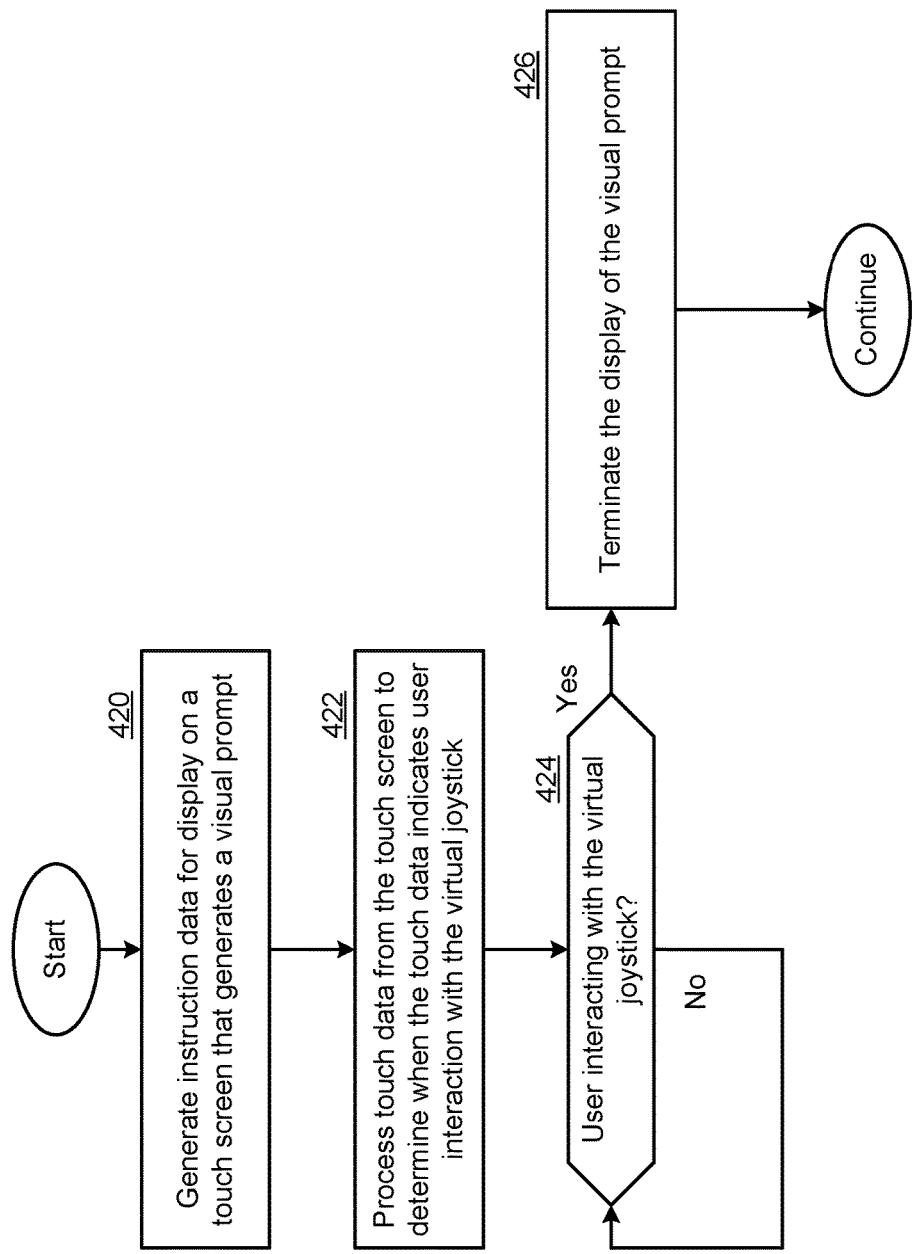

TOUCH SCREEN WITH VIRTUAL JOYSTICK AND METHODS FOR USE THEREWITH

CROSS REFERENCE TO RELATED APPLICATIONS

The present U.S. Utility Patent Application claims priority pursuant to 35 U.S.C. § 120 as a continuation of U.S. Utility application Ser. No. 12/784,293, entitled "TOUCH SCREEN WITH VIRTUAL JOYSTICK AND METHODS FOR USE THEREWITH", filed May 20, 2010, which is hereby incorporated herein by reference in its entirety and made part of the present U.S. Utility Patent Application for all purposes.

BACKGROUND OF THE INVENTION

Technical Field of the Invention

The present invention relates to electronic devices that employ a touch screen.

Description of Related Art

Many computer devices and hand held games operate based on an integrated or peripheral joystick. The joystick can include a spring mounted actuator that can be moved about two or more axes of motion. Sensors associated with the joystick generate data in response to the motion of the joystick that can be used in the implementation of a user interface for the device. For example, the pitch and roll of an airplane in a flight simulator game can be controlled based on the user's interaction with a joystick.

Many devices, including handheld devices, can be equipped with a touch screen that provides another form of user interface. As the user touches the screen with a finger a stylus or other object, touch data is generated that can be used to input data to the device. Examples of such touch screens include resistive touch screens and capacitive touch screens that can resolve one or more simultaneous touches.

The disadvantages of conventional approaches will be evident to one skilled in the art when presented the disclosure that follows.

BRIEF SUMMARY OF THE INVENTION

The present invention is directed to various system, apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 12 presents a graphical representation of orientation data in accordance with an embodiment of the present invention.

FIG. 13 presents a graphical representation of orientation data in accordance with another embodiment of the present invention.

FIG. 14 presents a block diagram representation of a virtual joystick generator 202 in accordance with an embodiment of the present invention.

FIG. 19 presents a graphical representation of movement of view 304 of graphic 302 presented in the screen display of touch screen 100 in accordance with an embodiment of the present invention.

FIG. 20 presents a pictorial representation of a screen display of touch screen 100 in accordance with an embodiment of the present invention.

FIG. 25 presents a flowchart representation of a method in accordance with an embodiment of the present invention.

FIG. 26 presents a flowchart representation of a method in accordance with an embodiment of the present invention.

FIG. 27 presents a flowchart representation of a method in accordance with an embodiment of the present invention.

DETAILED DESCRIPTION OF THE INVENTION

Figure 1:
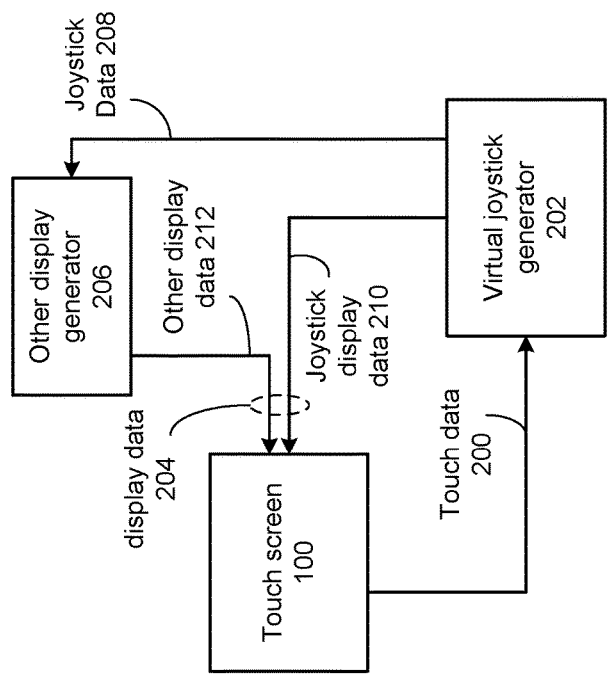
FIG. 1 presents a block diagram representation of a virtual joystick generator 202 in accordance with an embodiment of the present invention.

FIG. 1 presents a pictorial representation of a virtual joystick generator 202 in accordance with an embodiment of the present invention. In particular, a virtual joystick generator 202 is presented for use in conjunction with an electronic device that hosts the touch screen 100. Examples of such an electronic device include a personal computing device such as an Apple iPad computer or iPod Touch, a smart phone such as the Apple iPhone, Android phone or other smart phone, a handheld video game or other electronic device that includes a touch screen.

Touch screen 100 includes a display screen, such as a liquid crystal display (LCD), light emitting diode (LED), plasma display or other two dimensional or three dimensional display that displays graphics, text or video in either monochrome or color in response to display data 204.

In operation, the virtual joystick generator generates joystick display data 210 for display on the touch screen 100. For example, the joystick display data 210 creates a visual representation of a virtual joystick when displayed on the touch screen 100 that can be used interactively by the user as part of a graphical user interface of the host device. In particular, the virtual joystick generator 202 processes touch data 200 from the touch screen 100 to determine when the touch data 200 indicates user interaction with the virtual joystick. When the touch data 200 indicates user interaction with the virtual joystick, the virtual joystick generator 202 operates based on the touch data 200 to adjust the joystick display data 210 to reflect the user interaction with the virtual joystick. In addition, the virtual joystick generator 202 generates joystick data 208 based on the user interaction with the virtual joystick.

Figure 2:
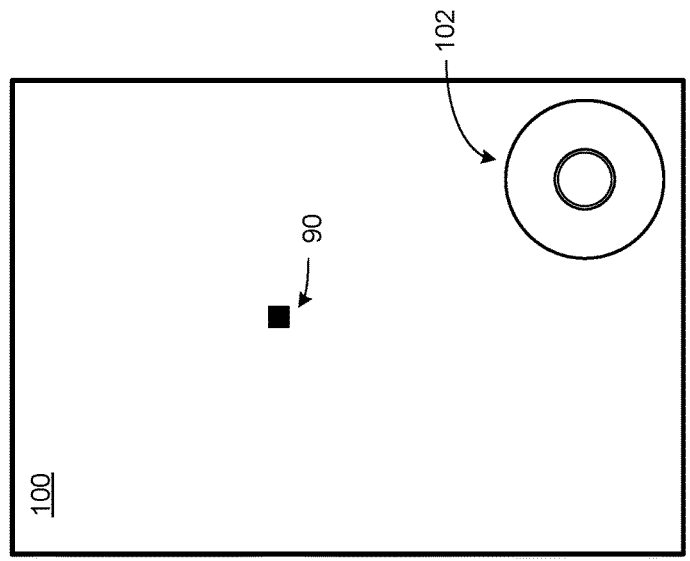
FIG. 2 presents a pictorial representation of a screen display of touch screen 100 in accordance with an embodiment of the present invention.

The joystick data 208 can be used in conjunction with another display generator 206 to generated display data 204. For example, the display of at least one other element on the touch screen 100 is adjusted based on the joystick data 208. FIG. 2 presents a pictorial representation of a screen display of touch screen 100 in accordance with an embodiment of the present invention. In particular, an example of a virtual joystick is displayed in the lower right-hand portion of the display of touch screen 100. User interactions with virtual joystick 102 generate joystick data 208 that can be used by a game or other application, utility, operating system or other program of the host device to control, for example, the position, orientation and/or motion of an object 90 that is displayed on the screen. While shown representationally as a simple square, the object 90 can be a game object or character, a cursor, a highlighted area, tab, menu item, or other graphical object displayed by touch screen 100.

Figure 3:
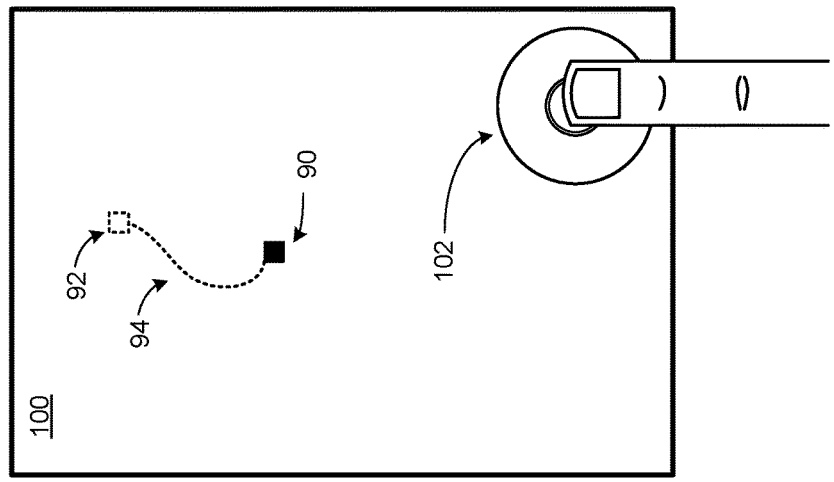
FIG. 3 presents a pictorial representation of a screen display of touch screen 100 in accordance with an embodiment of the present invention.

FIG. 3 presents a pictorial representation of a screen display of touch screen 100 in accordance with an embodiment of the present invention. In this example, touch data 200 is generated by touch screen 100 in response to interactions with the user, such as the motion of the user's finger in contact with or close proximity to the surface of touch screen 100 as shown. As shown, user interactions with the virtual joystick 102 generates joystick data 208 that is processed by other display generator 206 to generate display data 204 that renders the object 90. In this instance, the joystick data 208 causes the object 90 to move from an initial position 92 along path 94 to the final position shown.

In an embodiment of the present invention, the virtual joystick generator 202 and other display generator 206 are implemented as part of a video game executed by the host device that includes touch screen 100. A user of the host device interacts with the virtual joystick by touching a portion of the display screen that displays the virtual joystick. The joystick display data 210 is adjusted with changes in touch data 200 to, for example, provide the user visual feedback. In this fashion, the user can move around the virtual joystick in similar fashion to a real joystick. The resulting joystick data 208 can be used by the game to control the position, orientation and/or motion of a character, a game object of other element of the game. While described above as part of a user interface of a video game, virtual joystick generator 202 and other display generator 206 can similarly be implemented in conjunction with other applications of a host device to control or provide other input in conjunction with a graphical user interface.

In another embodiment of the present invention, the virtual joystick generator 202 and other display generator 206 are implemented as part of an operating system executed by the host device that includes touch screen 100. In this fashion, the joystick data 208 can be used in a similar fashion to a mouse, touchpad, thumb wheel or other pointing device to interact with the host device.

In an embodiment of the present invention, the virtual joystick generator 202 and other display generator 206 can be implemented using either dedicated or shared processing resources that can include a microprocessor, micro-controller, digital signal processor, graphics processor, microcomputer, central processing unit, field programmable gate array, programmable logic device, state machine, logic circuitry, analog circuitry, digital circuitry, and/or any device that manipulates signals (analog and/or digital) based on operational instructions that are stored in memory. Note that when the virtual joystick generator 202 and other display generator 206 implement one or more of their functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In the alternative, the memory may be a single memory device or a plurality of memory devices. Such a memory device may be a read-only memory, random access memory, volatile memory, non-volatile memory, static memory, dynamic memory, flash memory, cache memory, and/or any device that stores digital information. It should be noted that the host device that include touch screen 100, virtual joystick generator 202 and other display generator 206 and can include additional components that are not expressly shown.

Further features including many optional functions and implementations of the present invention are described in conjunction with FIGS. 4-19 that follow.

Figure 4:
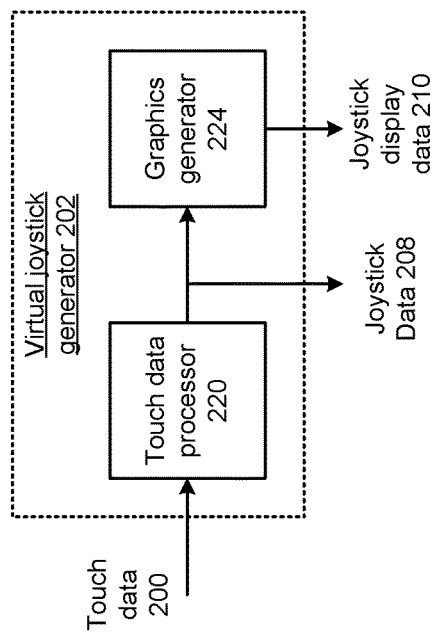
FIG. 4 presents a block diagram representation of a virtual joystick generator 202 in accordance with an embodiment of the present invention.

FIG. 4 presents a block diagram representation of a virtual joystick generator 202 in accordance with an embodiment of the present invention. In particular, virtual joystick generator 202 includes touch processor 220 and graphics generator 224. In particular, graphics generator 224 generates joystick display data 210 to create a visual representation of a virtual joystick when displayed on the touch screen 100 that can be used interactively by the user as part of a graphical user interface of the host device. The touch data processor 220 processes touch data 200 from the touch screen 100 to determine when the touch data 200 indicates user interaction with the virtual joystick. When the touch data 200 indicates user interaction with the virtual joystick, the touch data processor 220 generates joystick data 208 that is used by the graphics generator 224 to adjust the joystick display data 210 to reflect the user interaction with the virtual joystick. In addition, the touch data processor 220 the joystick data 208 can be used by other display generator 208 as previously described to, for example, control the movement of object 90.

Figure 5:
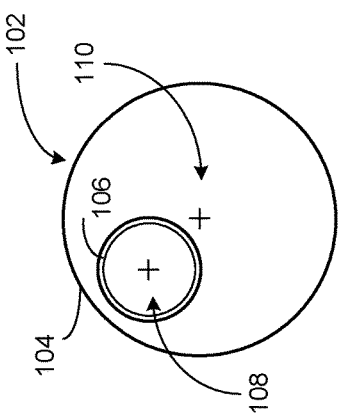
FIG. 5 presents a pictorial representation of virtual joystick generator 102 in accordance with an embodiment of the present invention.

FIG. 5 presents a pictorial representation of virtual joystick generator 102 in accordance with an embodiment of the present invention. In an embodiment of the present invention, the virtual joystick 102 includes a boundary 104 and an actuator 106. Touch data processor 220 receives touch data 200 such as screen coordinates, pixel locations or other data that represents the position 108 that is being touched by the user.

In an embodiment of the present invention, the boundary 104 is a visible boundary that is part of the graphic displayed on touch screen 100 based on joystick display data 210. In addition, the boundary 104 or another "virtual" boundary can be used by touch data processor 220 to determine whether or not the user is interacting with the virtual joystick 102. This virtual boundary can be larger, smaller, have a different shape or can otherwise be different to, for example, compensate for user parallax or other human factors issues. In operation, the touch data processor 220 initially determines whether the user is interacting with the virtual joystick 102 based on whether a new touch position 108 is inside the boundary 104. In the example shown, the touch position 108 falls within the boundary 104. In response, touch data processor 220 generates joystick data 208 that indicates the touch position 108, for example, as an offset from the centroid of boundary 104, as absolute Cartesian coordinates, as polar coordinates that represent the magnitude and angle of deviation or via other data.

In the example shown, graphics generator 224 adjusts the joystick display data 210 to reflect the touch 108 by rendering the actuator 106 in a new position that is centered on the touch position 108. This provides visual feedback to the user as to how they are interacting with the virtual joystick 102.

In the absence of interaction by the user, the graphics generator 224 can generate joystick display data 210 that renders the actuator 106 to be centered at the center position 110 of boundary 104. In effect, this replicates the operation of many physical joysticks that have a center actuator that is spring-loaded. The actuator 106 in the virtual joystick, like the center actuator of similar physical virtual joysticks, returns to a center position 110 when the user "lets up" on the actuator. In the event of no user interaction, the joystick data 208 from touch data processor 220 can indicate the coordinates at the center of the virtual joystick 102, an arbitrary orientation and no magnitude or else null data indicating the lack of interaction.

Figure 6:
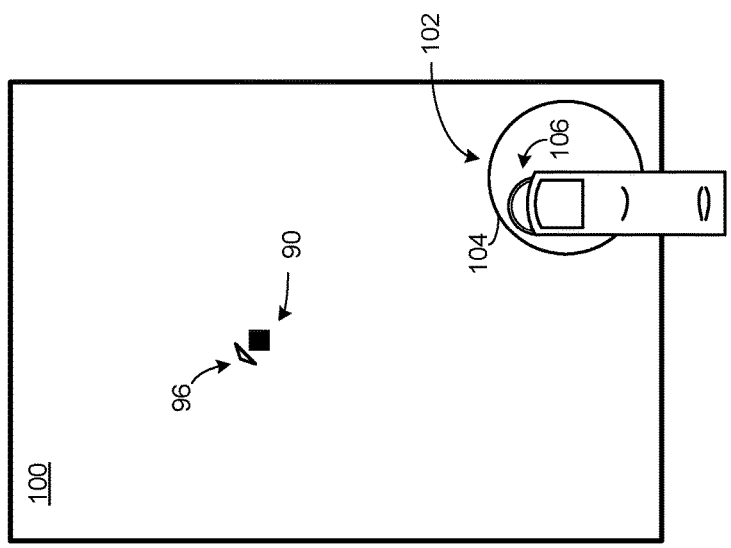
FIG. 6 presents a pictorial representation of a screen display of touch screen 100 in accordance with an embodiment of the present invention.

FIG. 6 presents a pictorial representation of a screen display of touch screen 100 in accordance with an embodiment of the present invention. As discussed in conjunction with FIG. 5, the joystick data 208 can include polar coordinates that represent the magnitude and angle of deviation of the virtual joystick 102. Also, as previously discussed in conjunction with FIG. 3, the joystick data 208 is processed by other display generator 206 to generate display data 204 that renders the object 90.

In an embodiment of the present invention, the orientation information included in joystick data 208 can be used to display visual orientation feedback on the touch screen 100 that is separate from the visual representation of the virtual joystick 102. In the example shown, the orientation indicated by virtual joystick 102 indicates a direction of motion of the object 90. In addition, the magnitude of the deviation of the virtual joystick 102 from the centroid of the boundary 104 controls the velocity of the object 90. While the rendering of the position of actuator 106 provides one form of visual feedback to the user, in this example, an object compass 96 is rendered by other display generator 206 along with object 90. As shown object compass 96 also indicates a direction of motion of the object 90—in a manner that can be more easily viewed by a user whose attention may be focused on the object 90, rather than the virtual joystick 102.

Figure 7:
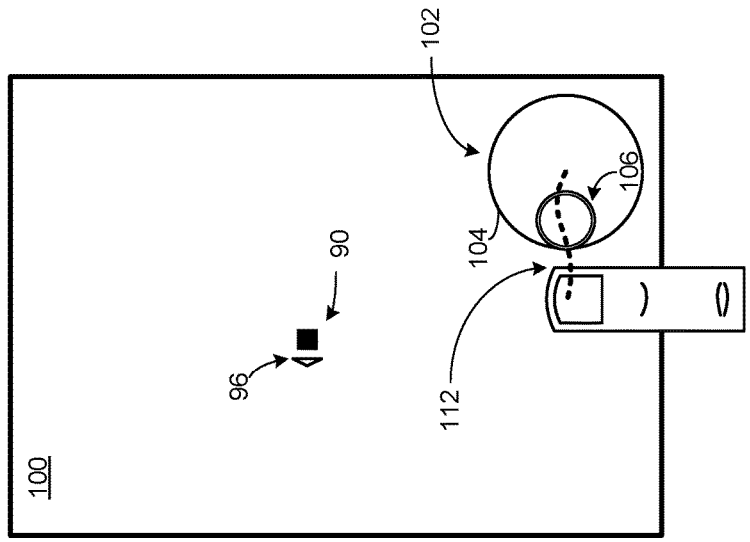
FIG. 7 presents a pictorial representation of a screen display of touch screen 100 in accordance with an embodiment of the present invention.

FIG. 7 presents a pictorial representation of a screen display of touch screen 100 in accordance with an embodiment of the present invention. As discussed in conjunction with FIG. 5, the touch data processor 220 initially determines whether the user is interacting with the virtual joystick 102 based on whether a new touch position is inside the boundary 104. While the initial touch that begins control of the object 90 must be within the boundary 104, in the embodiment shown, the touch data processor 220 continues to generate joystick data 208, even when the touch position leaves the boundary 104, as long as the user does not lift his or her finger. Said another way, the touch processor 220 continues to indicate interaction with the virtual joystick 102 when the touch data 200 corresponds to an initial touch of the touch screen 100 inside the boundary 104 and further corresponds to dragging the touch outside the boundary 104. As long as the user's finger is not lifted, it can be dragged to different positions, inside or outside of boundary 104, to continuously or periodically update the joystick data 208 and the corresponding joystick display data 210. In this fashion, the user can maintain control of the object 90 on a real-time basis.

In the example shown, the user touch is continuous and follows path 112 from a position near the center of virtual joystick 102 to a position outside of the boundary 104. In an embodiment of the present invention, a speed of motion of object 90 can be determined based on the magnitude of the distance between the position of object 90 and the touch position along path 112. In one mode of operation, the value of the magnitude is truncated to a maximum velocity when the distance is greater than a distance threshold corresponding to, for example, the radius of boundary 104. In the example shown, the actuator 106 is displayed at a maximum position, with joystick data 208 indicating a maximum magnitude when the touch position is dragged along path 112 outside of the boundary 104.

Further, the orientation reflected in joystick data 208 can be the orientation of the touch position along path 112 with relation to the center of the virtual joystick 102. This allows a user's touch to slip outside of the boundary without disabling the operation of the virtual joystick 102. As before however, should the user lift his or her finger from the touch screen 100, the actuator 106 returns to the center—indicating no user interaction with the virtual joystick 102.

Figure 8:
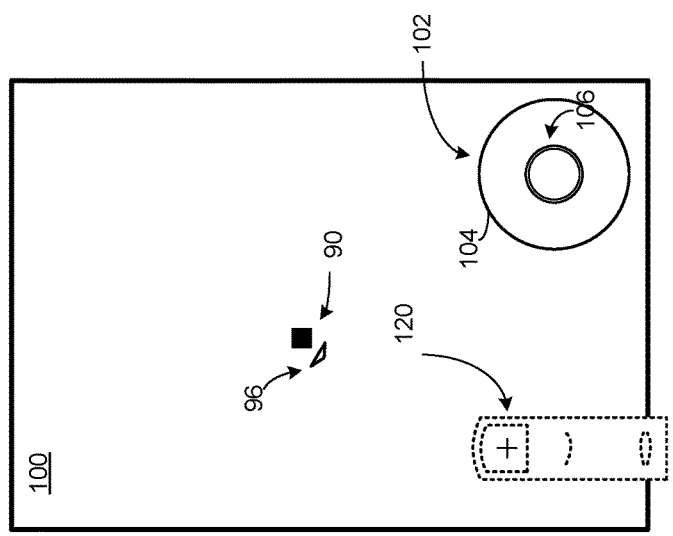
FIG. 8 presents a pictorial representation of a screen display of touch screen 100 in accordance with an embodiment of the present invention.

FIG. 8 presents a pictorial representation of a screen display of touch screen 100 in accordance with an embodiment of the present invention. In particular, an additional mode of operation is presented whereby the object 90 can be controlled by touch without interaction with the virtual joystick 102. A user touches the touch screen 100 at a position 120 outside of the boundary 104 of virtual joystick 102. Touch data 200 is processed by touch data processor 220 which determines that the user is not interacting with the virtual joystick 102. In this mode of operation however, the touch data 200 is passed to the other display generator 206 that generates other display data 212 to render the object 90 and the orientation compass 96 based on the relative position between the object 90 and the touch position 120. In particular, the orientation reflected by the orientation compass 96 and used to control the direction of motion of object 90 is determined based on the vector between the position of object 90 and the touch position 120.

In an embodiment of the present invention, a speed of motion can be determined based on the magnitude of the distance between the position of object 90 and the touch position 120. In one mode of operation, the value of the magnitude can be truncated to a maximum velocity when this distance is greater than a distance threshold.

Figure 9:
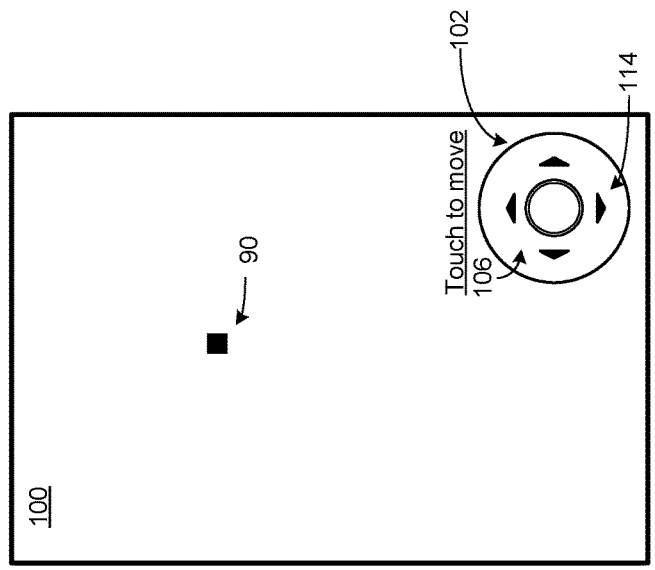
FIG. 9 presents a pictorial representation of a screen display of touch screen 100 in accordance with an embodiment of the present invention.

FIG. 9 presents a pictorial representation of a screen display of touch screen 100 in accordance with an embodiment of the present invention. In this embodiment, virtual joystick generator 202, via graphics generator 224, generates joystick display data 210 that includes instruction data for display on the touch screen 100. In particular, the instruction data generates a display of a visual prompt on the touch screen 100 that instructs the user on use of the virtual joystick 102. In the example shown, the visual prompt includes the text "touch to move" and the compass indicators 114 that are positioned around the actuator 106.

In one mode of operation, the instruction data is generated when the virtual joystick 102 is initially generated, for instance, on commencement of the game or other application, utility, operating system or other program that is associated with the virtual joystick 102. In an embodiment of the present invention, the display of the visual prompt is terminated when the touch data indicates user interaction with the virtual joystick. In this fashion, once the user starts using the virtual joystick 102, the visual prompt is no longer necessary and the visual prompt can be removed. In an alternative embodiment, the visual prompt is displayed either for a limited time or terminated at the earlier of a limited time or the first user interaction with the virtual joystick 102.

Figure 10:
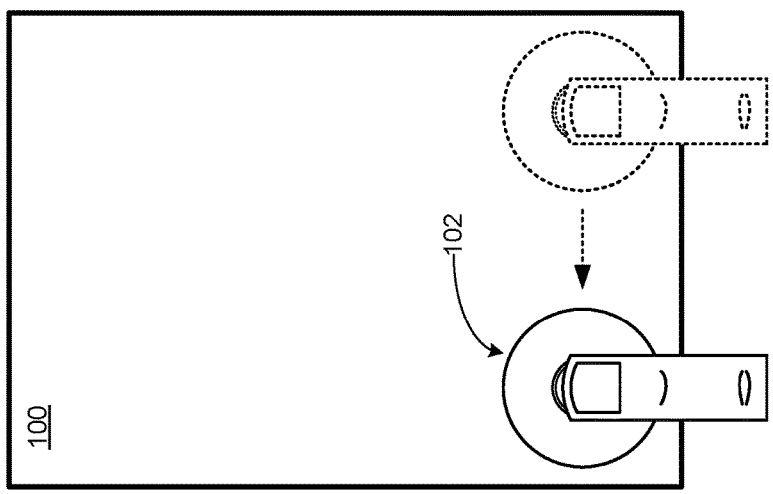
FIG. 10 presents a pictorial representation of a screen display of touch screen 100 in accordance with an embodiment of the present invention.

FIG. 10 presents a pictorial representation of a screen display of touch screen 100 in accordance with an embodiment of the present invention. In this embodiment of the present invention, the user can interact with the touch screen 100 to change the position of the virtual joystick 102. This mode of operation can be initiated via user selection of an option in a settings menu or other mode selection in association with the game or other application, utility, operating system or other program associated with the virtual joystick 102. For example, the user can select one of a plurality of predefined positions such as: right-hand or left-hand positions or virtual joystick positions chosen explicitly or inferentially based on a portrait or landscape display layout. In further examples, the touch data processor 220 can determine a user's desire to move the virtual joystick 102 based on an analysis of the touch data 200. For instance, a user's double tap of the virtual joystick 102, pressing and holding virtual joystick for a time period that exceeds a second or two, a two-finger drag or swipe or other gesture can be detected by touch data processor 220 and used to initiate a mode of operation where the virtual joystick 102 can be repositioned.

In a further example, the user is allowed to select a customized position for the virtual joystick 102. In the example shown, the user has initiated a custom joystick positioning mode of operation via a special gesture or as part of a settings menu of the game or other application, utility, operating system or other program associated with the virtual joystick 102. In this mode of operation, the touch data 200 is used to adjust the centroid position of virtual joystick 102. Graphics generator 224 adjusts the joystick display data 210 to the touch position. In particular, the user can either drag the virtual joystick 102 to a desired location on the touch screen 100, or touch the screen at a point corresponding to a desired location. After the virtual joystick has been relocated, the user is optionally given the option, via a text prompt or menu selection for example, to accept or discard the new location. Once accepted, the touch data processor 220 and graphics generator 224 can be updated to the new centroid.

In another example, the virtual joystick 102 can be repositioned for each new touch of the display screen 100. When a new touch is initiated, the initial position of the touch is used by the touch data processor 220 to set the centroid of the virtual joystick 102. This position of the virtual joystick 102 can be maintained as long as the touch is continuous, with differences in touch positioning from the initial touch position being used to generate joystick data 208. Once the touch ends and a new touch begins, the virtual joystick 102 can be relocated to the position of the new touch.

Figure 11:
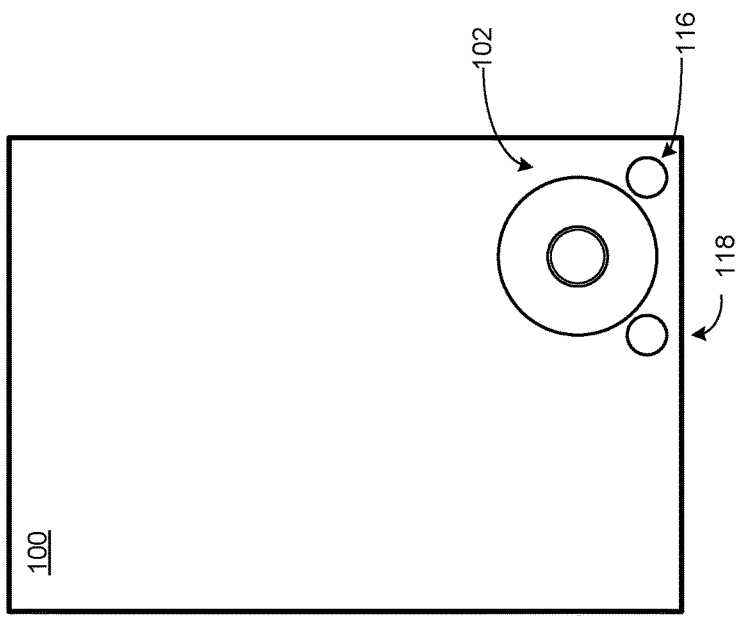
FIG. 11 presents a pictorial representation of a screen display of touch screen 100 in accordance with an embodiment of the present invention.

FIG. 11 presents a pictorial representation of a screen display of touch screen 100 in accordance with an embodiment of the present invention. In this embodiment joystick display data 210 is generated to include one or more adjunct buttons, such as virtual buttons 116 and 118. In operation, touch data processor 220 further operates to determine when either of the adjunct buttons 116, 118 has been selected by user touch. In response, the touch data processor 220 generates joystick data 208 that includes button selection data via a flag or other data that indicates that the corresponding button or buttons have been selected by the user.

In this fashion, the user can interact with the either the virtual joystick 102 or the buttons 116, 118 to interact with the game or other application, utility, operating system or other program associated with the virtual joystick 102. It should be noted that in operation of a multi-touch compatible touch screen 100, touch data 200 can resolve multiple simultaneous touches. In this implementation, the user has the option of interacting with the virtual joystick 102 and one or more of the buttons 116, 118 simultaneously.

FIG. 12 presents a graphical representation of orientation data in accordance with an embodiment of the present invention. In an embodiment of the present invention, the touch data processor 220 receives orientation data pertaining to one or orientations $\theta_i$, that are advantageous to the operation of the game or other application, utility, operating system or other program. For example, in a racing game or navigation application, an advantageous orientation could be in the direction of a roadway. In an application where the object 90 is a highlight cell, the advantageous orientation could be in the direction of an adjacent cell. In a further example involving the movement of a game character in a virtual world, an advantageous orientation could correspond to the direction of entry to a door, tunnel, hole, pipe or other thoroughfare or passageway.

In operation, the touch data processor 220 generates joystick data 208 based on orientation data pertaining to one or such orientations $\theta_i$. In an embodiment of the present invention, the touch data processor 220 generates orientation data $\theta_a$ as previously described. In this case however, the actual orientation data can be further processed by comparing the orientation data to a range of orientations, such as +/−Δθ about at least one advantageous orientation $\theta_i$. In particular, the touch data processor 220 generates the joystick data 208 to indicate the advantageous orientation $\theta_i$, in addition to or instead of, the actual orientation $\theta_a$, when the orientation data $\theta_a$ compares favorably to the range of orientations about the advantageous orientation $\theta_i$.

For example, consider a case where an advantageous orientation of motion $\theta_i$, is 45 degrees from the current position of object 90. A capture range may be defined as a range of +/−15° degrees about the advantageous orientation—or a range of 30°-60°. When the actual orientation data generated by touch data processor 220 indicates an orientation $\theta_a$, of 36°, the touch data processor 220 generates joystick data 208 that indicates the advantageous position of 45°. In this fashion, the motion of the object 90 can be controlled by the user to the advantageous orientation by generating an actual orientation via the virtual joystick 102, anywhere within the capture range.

As noted above, the joystick data 208 can include both the actual orientation $\theta_a$ and the "captured" advantageous orientation $\theta_i$. In this fashion, the orientation compass 96 and actuator 106 can be set to reflect either the actual orientation $\theta_a$ or the advantageous orientation $\theta_i$, depending on the particular implementation. It should be noted further that, while the term "advantageous" has been used, in the context of games, an advantageous orientation could be viewed from the perspective of the operation of the game, rather than from the perspective of a particular user. In particular, one particular advantageous orientation for the game could be an orientation that causes the user's character to fall in a pit. While this could be ultimately disadvantageous to the user's character, it might, nevertheless be advantageous to the game because it introduces an element of danger that makes the game more exciting to the user. For this reason, the term "advantageous" as used herein can encompass any outcome that can be "captured" based on a similar input.

FIG. 13 presents a graphical representation of orientation data in accordance with another embodiment of the present invention. In this embodiment, the touch data processor 220 generates joystick data 208, based on three advantageous orientations $\theta_2$, $\theta_5$, and $\theta_8$. Considering the joystick data 208 to be represented by $D_{js}$, $$D_{js}=F(\theta_a,\theta_2,\theta_5,\theta_8)$$

where F is a nonlinear capture function.

Consider an example where the object 90 is a virtual digger implemented as part of a video game. In this example, the virtual digger can "dig" only in orientations $\theta_2$, $\theta_5$, and $\theta_8$, corresponding to the directions of 90°, 180°, and 270°. In addition, the virtual digger can move along horizontal tunnels in directions 90°, and 270°. Further, the virtual digger includes a jet pack that allows it to "fly" upward, in vertical and off-vertical directions. In accordance with this example, the nonlinear capture function F, can be defined as follows:

$$F(\theta_a,\theta_2,\theta_5,\theta_8)=\theta_2, \text{ if } \theta_1\leq\theta_a<\theta_3;$$

$$F(\theta_a,\theta_2,\theta_5,\theta_8)=\theta_5, \text{ if } \theta_4\leq\theta_a<\theta_6;$$

$$F(\theta_a,\theta_2,\theta_5,\theta_8)=\theta_8, \text{ if } \theta_7\leq\theta_a<\theta_9;$$

$$F(\theta_a,\theta_2,\theta_5,\theta_8)=\theta_a, \text{ if } \theta_9\leq\theta_a<\theta_1; \text{ and}$$

$$F(\theta_a,\theta_2,\theta_5,\theta_8)=\theta_n, \text{ if } \theta_3\leq\theta_a<\theta_4 \text{ or } \theta_6\leq\theta_a<\theta_7;$$

where $\theta_n$ represents a null value. In particular, the capture function serves to "capture" orientations that are within a small range of each of the orientations $\theta_2$, $\theta_5$, and $\theta_8$, to cause the digger to dig in an allowed direction or to, for example, move horizontally through a previously dug tunnel. The digger can be commanded to fly by generating any orientation that falls in the range $\theta_9\leq\theta_a<\theta_1$. Note that these values are not captured, rather flight can be commanded in any direction in this range. Further, orientations in the range $\theta_3\leq\theta_a<\theta_4$ or $\theta_6\leq\theta_a<\theta_7$, can be reassigned to a null value, since these orientations correspond to invalid commands and are outside the capture range of the three advantageous orientations and outside the range of allowed flight.

It should be noted that the example above is merely illustrative of one of the many possible implementations of a nonlinear capture function F. It should be further noted that while the capture function F has been formulated above in terms of orientations indicated by joystick data 208 generated by the virtual joystick 102, other advantageous outcomes and other data can likewise be used in other implementations. In a further example, advantageous outcome can be defined in terms of Cartesian coordinates and captured when within a predefined region or distance. In another example, the capture function F can attempt to correlate the joystick data 208 to one of a plurality of advantageous outcomes via a ranking and selection of the highest ranked alternative. As will be understood by one skilled in the art, other functions, linear or nonlinear can be likewise be implemented.

FIG. 14 presents a block diagram representation of a virtual joystick generator 202 in accordance with an embodiment of the present invention. In particular, touch data processor 220 includes a post processing stage 230 that can be employed in the generation of the joystick data 208.

In an embodiment of the present invention, the post processing stage 230 processes the touch data 200 to determine a bias corresponding to the user interaction with the virtual joystick. For example, when a user uses his or her finger as method of interacting with the touch screen 100, the user may not accurately judge the touch position. Because the user views their finger from above, they cannot actually see the spot where their finger touches the touch screen 100. The result could be errors in command—particularly for "fine" motion commands having small offsets from the centroid of the virtual joystick 102. In accordance with this embodiment, the post processing stage 230 generates bias offset data that reflects an observed bias, and the joystick data 208 is generated by touch data processor to compensate for the bias.

In one mode of operation, the post processing stage 230 analyzes a plurality of touch data 200 regarding the user's interaction with the virtual joystick 102. Filtering along the x-axis and y-axis can yield average positions that can be used to indicate a potential bias along either axis. In another embodiment, capture function results can be used to indicate user bias. In particular, consistent deviations from advantageous outcomes can also be isolated via processing over multiple touch events and used to indicate bias offsets. The post processing stage 230 can include a Kalman filter, neural network or other learning algorithm that analyzes touch data 200 to isolate input bias based on feedback data 232 from the game or other application, utility, operating system or other program that indicates results from using the joystick data 208. For example, an optimization approach can be employed for bias correction by monitoring a series of changes in the position of the touch control. These touch position changes can be aggregated and used to generate an optimal bias correction that is used to minimize the error between raw touch locations and their corresponding advantageous move interpretations.

The post processing stage 230 can optionally contain filtering to filter the joystick data 208. In an embodiment of the present invention, the post processing stage 230 lowpass filters the joystick data 208 to reduce rapid variations that may be unintentionally generated by the user in a bumpy environment, when the user shifts position or otherwise in error. Highpass filtering can be employed so as to isolate changes in touch data 200 as a way to correct for bias. Likewise post processing stage 230 can contain other processing or data conditioning to prepare the joystick data 208 for use by the game or other application, utility, operating system or other program.

Figure 15:
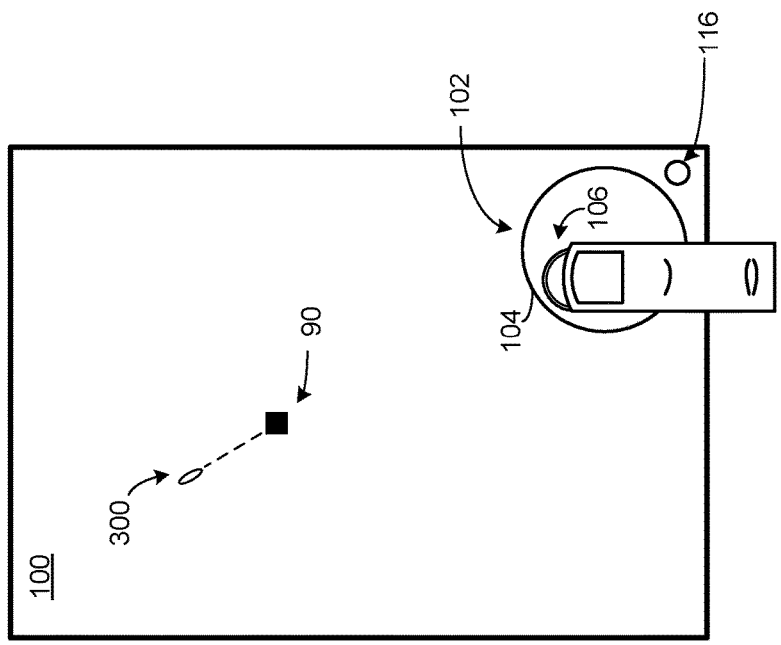
FIG. 15 presents a pictorial representation of a screen display of touch screen 100 in accordance with an embodiment of the present invention.

FIG. 15 presents a pictorial representation of a screen display of touch screen 100 in accordance with an embodiment of the present invention. While much of the foregoing description has focused on the use of virtual joystick 102 to represent the direction and velocity of motion of object 90, joystick data 208 can be used for other purposes, such as to control other actions of the object 90, depending on the game or other application, utility, operating system or other program.

In the example shown, the object 90 is a game character that fires a projectile 300 generated by other display generator 206. Joystick data 208 can be used to determine the direction of fire of the projectile 300 via an orientation θ derived from touch data 200. In addition, a rate of fire, projectile velocity, or other firing parameter can be determined based on the magnitude of deviation of actuator 106 from the centroid of virtual joystick 102. It should be noted that, in this embodiment, the firing of projectile 300 alleviates the necessity of displaying object compass 96 to provide visual orientation feedback to the user. In particular, the path of projectile 300, itself provides a visual indication to the user of the orientation selected via virtual joystick 102. In addition, the visualization of the path of projectile 300 can be enhanced by other display generator 206 by further generating a tracer effect that provides a fading display of projectile 300 or other temporary visualization of the path of projectile 300.

In an embodiment of the present invention, the object 90 can be stationary in a game scene presented by touch screen 100. In another embodiment, the object 90 can be moveable via actions of another virtual joystick 102 or via other user input device not shown. In a further embodiment, a single joystick 102 can be selectably employed to control either the motion of object 90 or the firing of projectile 300 via user interaction with an adjunct button 116. For example, the operation of joystick 102 can be toggled between a first mode of operation corresponding to motion control and a second mode of operation corresponding to firing control by tapping the adjunct button 116.

Figure 16:
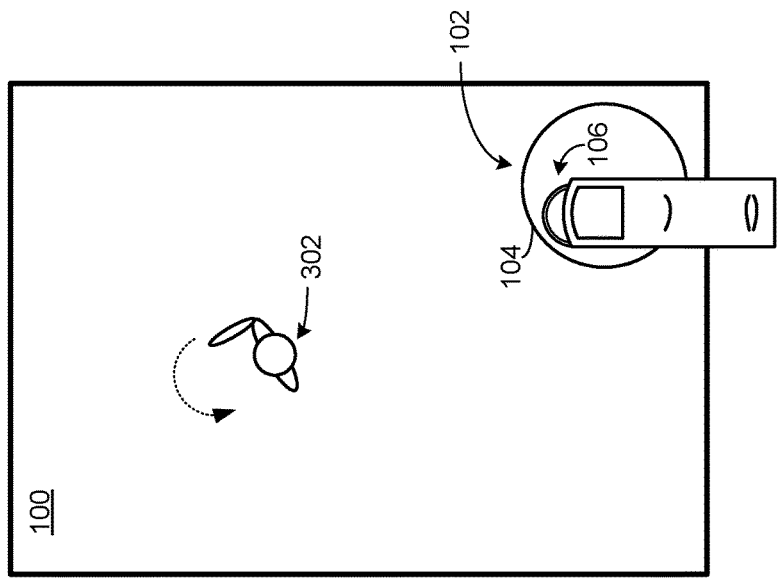
FIG. 16 presents a pictorial representation of a screen display of touch screen 100 in accordance with an embodiment of the present invention.

FIG. 16 presents a pictorial representation of a screen display of touch screen 100 in accordance with an embodiment of the present invention. As discussed in conjunction with FIG. 15, joystick data 208 can be used for other purposes, such as to control other actions of an object of a game or other application, utility, operating system or other program. In the embodiment shown, the object 302 represents a game character that has an orientation that is controlled via an orientation θ derived from touch data 200. As the user manipulates virtual joystick 102 to a different orientation, the display of character 302 is controlled to the selected orientation. Like the embodiment shown in conjunction with FIG. 15, changes in orientation of the character 302 alleviate the necessity of displaying object compass 96 to provide visual orientation feedback to the user.

It should be noted that the examples of FIGS. 15 and 16 provide but a few examples of the many applications of joystick data 208. In other examples, joystick data 208 including orientation, magnitude and/or position can be used to control other motion parameters such as acceleration, deceleration, other translational or rotational parameters, an applied force as well as other functions of an of object a game or other application, utility, operating system or other program.

Figure 18:
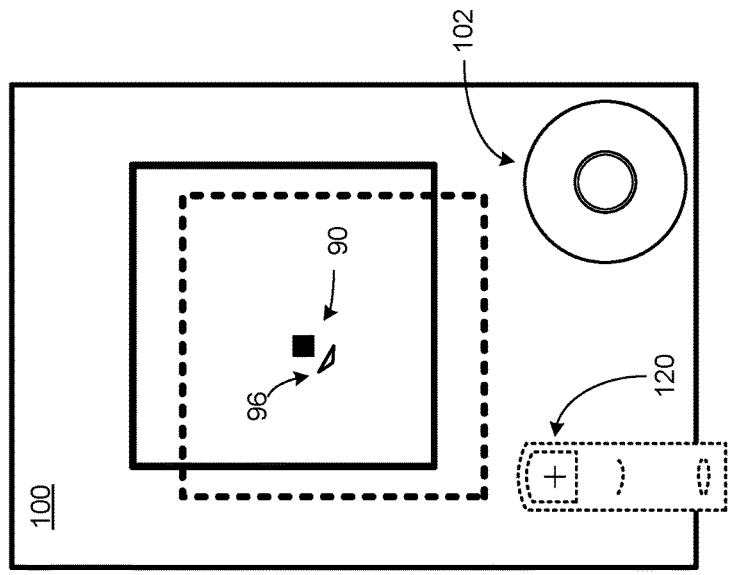
FIG. 18 presents a pictorial representation of a screen display of touch screen 100 in accordance with an embodiment of the present invention.
Figure 17:
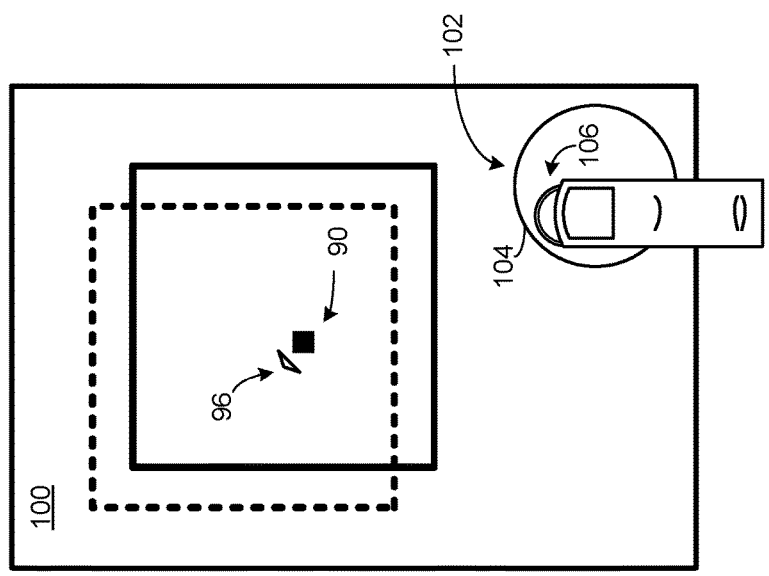
FIG. 17 presents a pictorial representation of a screen display of touch screen 100 in accordance with an embodiment of the present invention.

FIGS. 17 and 18 present pictorial representations of screen displays of touch screen 100 in accordance with embodiments of the present invention. In these embodiments, object 90 is overlaid on a background, such as a game map or scene, grid, graphics plane, data plane or other background. In the example shown, the background includes a graphical representation of a square. Virtual motion of the object 90 can be generated by moving the position of the background with relation to the object 90, instead of moving the position of object 90 with relation to the background. In the context of a game where the background is a game scene, this has the effect of a changing the location of a "virtual camera" that is capturing the game scene for the user.

In the example shown in FIG. 17, the user's interaction with virtual joystick 102 causes the object 90 is used to "move" in the direction indicated by object compass 96 by moving the background in the opposite direction. In this figure, motion is indicated by the movement of the square from a first position indicated by dashed lines to a second position indicated by solid lines. While the object 90 remains in a stationary position on the screen display of touch screen 100, the object 90 appears to move, due to the motion of the background. Similarly, in the example shown in FIG. 18, the user's other interaction with the touch screen 100—as described in conjunction with FIG. 8, creates the appearance of motion of object 90.

FIG. 19 presents a graphical representation of movement of view 304 of graphic 302 presented in the screen display of touch screen 100 in accordance with an embodiment of the present invention. In particular, graphic 302 represents a total background that can be displayed in conjunction with a game or other application, utility, operating system or other program. View 304 represents the portion of graphic 302 that is displayed by touch screen 100 at any given time. As discussed in conjunction with FIGS. 17 and 18, the virtual motion of object 90 can be generated by the motion of view 304 through different portions of graphic 302.

For example, graphic 302 can include an overhead map of a gaming area. The game can "move" object 90 throughout the gaming area under control of the user by moving the view 304 in response to joystick data 208. Where the object 90 represents a character or device, other display generator 206 can respond to the motion of the object 90 by rendering motion artifacts that may be particular to the form of the object 90. A character may appear to walk or run in the direction of motion at a walking/running rate that is based on the speed of motion. A device such as a rocket ship or rocket propelled digging device can be rendered with a rocket thrust in response to motion commands. Similarly, a digging device or car may be rendered to show spinning wheels or tracks that turn at a rate that is based on the speed of motion.

While the embodiments of FIGS. 17 and 18 have been described above in terms of a stationary object 90 and moving background, a combination of moving object and moving background can be employed as well to enhance a user's view 304 of important objects in graphic 302, to handle boundaries of graphic 302 or to otherwise display views 304 of graphic 302 in a more natural fashion.

FIG. 20 presents a pictorial representation of a screen display of touch screen 100 in accordance with an embodiment of the present invention. In this embodiment, object 90 is shown overlaid on a background that includes a map of a gaming scene. In this embodiment, touch screen 100 is multi-touch compatible screen and virtual joystick generator 202 generates two virtual joysticks 306 and 308. The two virtual joysticks 306 and 308 each operate independently, and in a similar fashion to virtual joystick 102, to control different aspects of object 90. For example, the virtual joystick 306 generates joystick data 208 that controls the orientation and motion of object 90 within the gaming scene, either by moving the object or by moving the scene with relation to the object. In addition, virtual joystick 308 generates further joystick data 208 that controls the firing of a projectile or other virtual weapon.

In the embodiment shown, each of the virtual joysticks 306 and 308 is drawn with dashed lines to represent that these virtual joysticks are rendered semi-transparent or otherwise pseudo-transparent, to be visible to the user, while retaining some visibility of the background on which they are overlaid.

While a particular embodiment is shown, other implementations of two virtual joysticks are likewise possible to control two different game characters, two other objects, or other functions and features used in conjunction with a game or other application, utility, operating system or other program.

Figure 21:
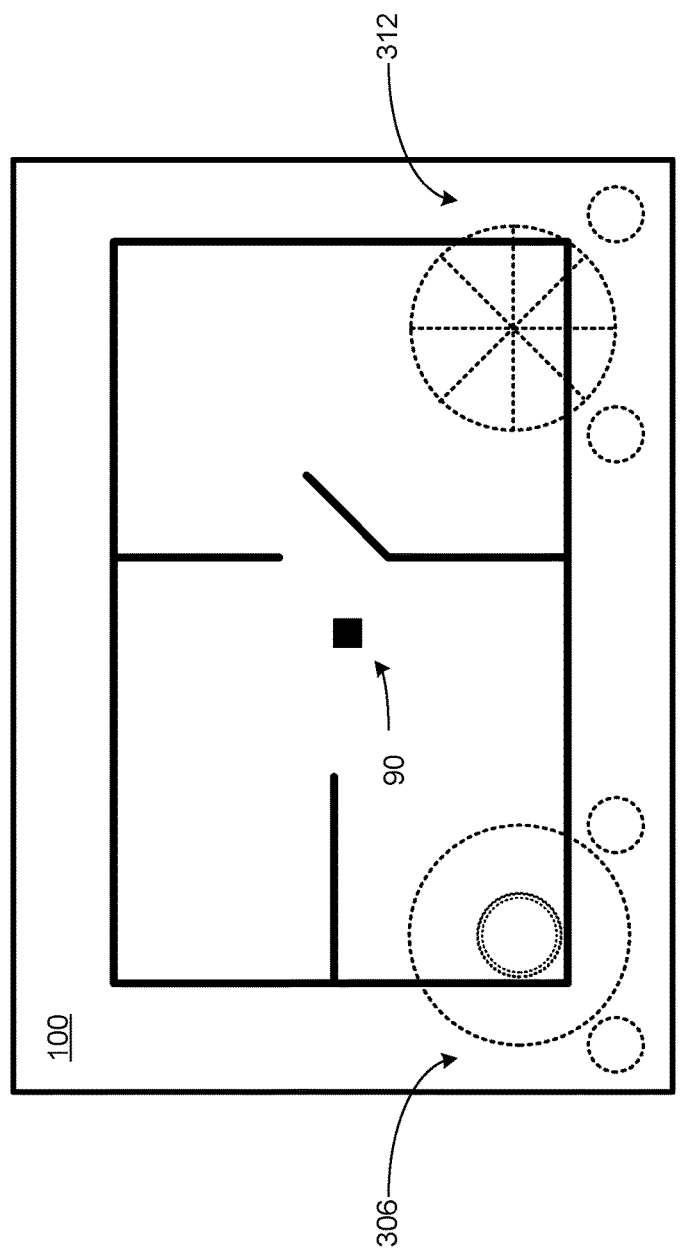
FIG. 21 presents a pictorial representation of a screen display of touch screen 100 in accordance with an embodiment of the present invention.

FIG. 21 presents a pictorial representation of a screen display of touch screen 100 in accordance with an embodiment of the present invention. An embodiment is shown, similar to the embodiment of FIG. 20 that contains many similar elements that are referred to by common reference numerals. In this embodiment however, discrete virtual joystick 312 is included in place of virtual joystick 308. In particular, the discrete virtual joystick is segmented into eight slices corresponding to firing commands in eight discrete directions. In operation, the touch data processor 220 analyzes touch data 200 within the outer boundary of discrete virtual joystick 312 (or dragged outside of the outer boundary as previously described) and either determines which segment is selected or otherwise discretizes the orientation resulting from the touch to the corresponding one of the eight possible orientations. In this fashion, the functionality of a virtual analog joystick can be approximated.

It should be noted that, while eight discrete segments are shown, a greater or fewer number can be implemented. In addition, while segmented graphic is presented in conjunction with discrete virtual joystick 312, a non-segmented graphic may be used nevertheless.

Figure 23:
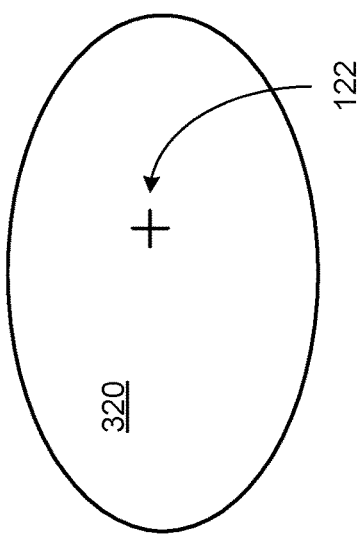
FIG. 23 presents a graphical representation of a touch region 320 in accordance with an embodiment of the present invention.
Figure 22:
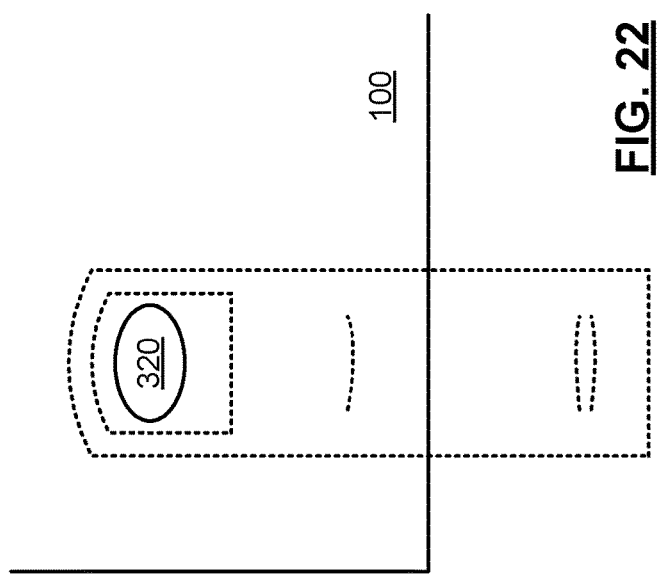
FIG. 22 presents a pictorial representation of a touch of touch screen 100 in accordance with an embodiment of the present invention.

FIGS. 22 and 23 present pictorial representations of a touch of touch screen 100 in accordance with embodiments of the present invention. A portion of a screen display of touch screen 100 is shown that includes a touch region 320 generated by the user's finger. In particular, when the user's finger comes close to the touch screen 100 or actually touches the touch screen 100, touch data 200 can be generated that identifies a plurality of pixels, depending on the type of touch screen employed. Each pixel in the touch region may be characterized by touch magnitudes corresponding to the pressure of the touch. In another embodiment, touch data 200 can correspond to a binary indication that a pixel is either touched or not touched. While shown as an ellipse, touch region 320 can be of another shape, including an irregular shape and a noncontiguous region.

In the presence of a possibly noncontiguous touch region 320, the touch data processor 220 optionally transforms the touch data to form a contiguous region. In an embodiment of the present invention, the touch data processor 220 generates a particular touch position 122 based on a center of mass, axis of rotation, two dimensional transform or other processing to approximate the touch position 122. In addition, touch data processor adjusts the touch position 122 to correct for user parallax or other bias, based on predetermined values or based on an analysis or prior touch data 200 via post processing stage 230, etc.

Figure 24:
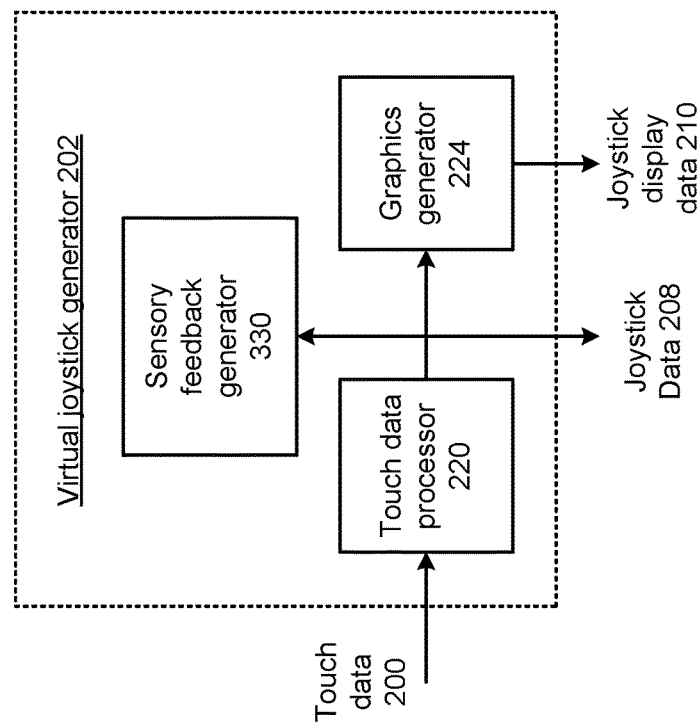
FIG. 24 presents a block diagram representation of a virtual joystick generator 202 in accordance with an embodiment of the present invention.

FIG. 24 presents a block diagram representation of a virtual joystick generator 202 in accordance with an embodiment of the present invention. In this embodiment, virtual joystick generator 202 includes a sensory feedback generator 330. In particular, sensor feedback generator 330 responds to joystick data 208 to signal to the user when touch data 200 indicates that the user's touch position has gone outside of an outer boundary of virtual joystick 102, such as boundary 104 or some other outer boundary. The sensory feedback generator can include a beeper, tone generator, buzzer or other audible alarm generator, a light, graphics generator or other generator of a visual indication, or a vibrator or other generator of tactile feedback.

In one example, after the user's touch extends beyond a boundary of virtual joystick 102, the touch data 200 is ignored. When the joystick data 208 indicates that the touch position approaches the boundary, but still prior to reaching the boundary, the sensory feedback generator initiates the audible, visual or tactile alarm to indicate the approaching boundary to the user. In an embodiment of the present invention, the sensory feedback generator 330 produces different levels of output based on the proximity of the touch position to a boundary. In an alternative embodiment, a single level can be presented. In this fashion, a user can compensate for the touch position prior to his or her touch data 200 being ignored.

FIG. 25 presents a flowchart representation of a method in accordance with an embodiment of the present invention. In particular, a method is presented for use with any of the functions and features described in conjunction with FIGS. 1-24. In step, 400, joystick display data is generated for display on the touch screen. The joystick display data can, for example, create a visual representation of a virtual joystick when displayed on the touch screen. In step 402, touch data from the touch screen is processed to determine when the touch data indicates user interaction with the virtual joystick. When the touch data indicates user interaction with the virtual joystick as indicated by the "yes" path from decision block 404, the joystick display data is adjusted as shown in step 406 to reflect the user interaction with the virtual joystick, based on the touch data, and joystick data is generated based on the user interaction with the virtual joystick as shown in step 408. In this fashion, the display of an object or other element on the touch screen can be adjusted based on the joystick data.

In an embodiment of the present invention, the visual representation of the virtual joystick includes a boundary and step 422 includes determining when the touch data corresponds to a touch of the touch screen inside the boundary and/or dragging the touch outside the boundary. Step 406 can include modifying a position of an actuator included in the virtual joystick to correspond to a position of a touch of the touch screen.

In an embodiment of the present invention, step 408 includes modifying a position of the virtual joystick on the touch screen in response to a user selection of the position of the virtual joystick. The virtual joystick can include at least one adjunct button that is selectable in response to user interaction. Step 402 can include determining when the at least one adjunct button is selected. Step 408 can include generating button selection data when the at least one adjunct button is selected.

FIG. 26 presents a flowchart representation of a method in accordance with an embodiment of the present invention. In particular, a method is presented for use with any of the functions and features described in conjunction with FIGS. 1-25. In step 410 orientation data is generated. In step 412 the orientation data is compared to a range of orientations about at least one advantageous orientation. In step 416, the joystick data is generated to indicate the advantageous orientation when the orientation data compares favorably to the range of orientations about the at least one advantageous orientation as shown from the "yes" branch from decision block 414. When the orientation data compares unfavorably to the range of orientations about the at least one advantageous orientation, as shown by the "no" branch from decision block 414, the method proceeds to step 418 where the joystick data is generated to indicate the orientation data.

FIG. 27 presents a flowchart representation of a method in accordance with an embodiment of the present invention. In particular, a method is presented for use with any of the functions and features described in conjunction with FIGS. 1-26. In step 420, instruction data is generated for display on the touch screen. The instruction data can, for instance, generate the display of a visual prompt on the touch screen that instructs the user on use of the virtual joystick. In step 422, touch data can be processed to determine when the touch data indicates user interaction with the virtual joystick. When the touch data indicates user interaction with the virtual joystick as shown by the "yes" branch from decision block 424, the method proceeds to step 426 where display of the visual prompt is terminated.

Figure 28:
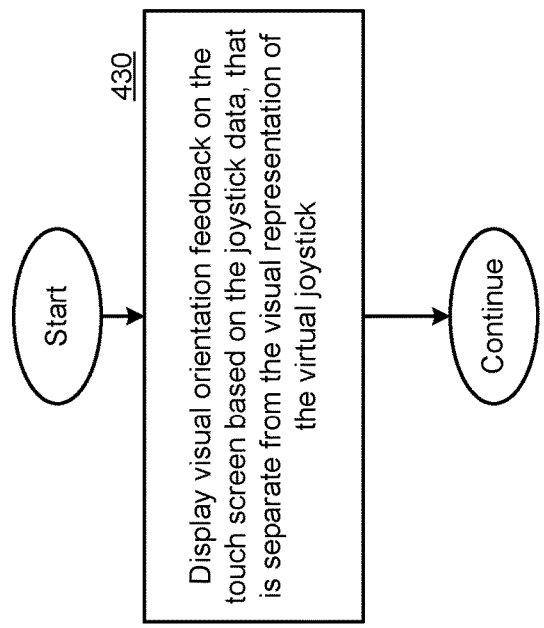
FIG. 28 presents a flowchart representation of a method in accordance with an embodiment of the present invention.

FIG. 28 presents a flowchart representation of a method in accordance with an embodiment of the present invention. In particular, a method is presented for use with any of the functions and features described in conjunction with FIGS. 1-27. In step 430, visual orientation feedback is displayed on the touch screen, based on the joystick data, wherein the visual orientation feedback is separate from the visual representation of the virtual joystick.

Figure 29:
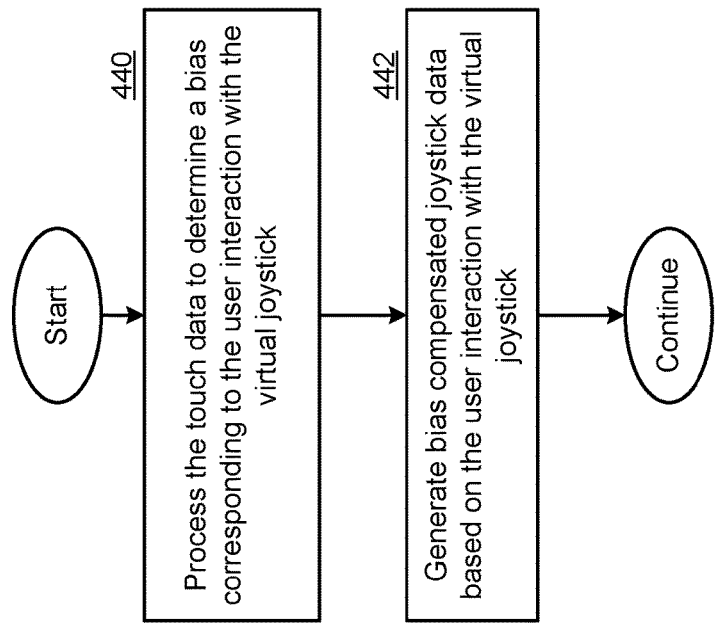
FIG. 29 presents a flowchart representation of a method in accordance with an embodiment of the present invention.

FIG. 29 presents a flowchart representation of a method in accordance with an embodiment of the present invention. In particular, a method is presented for use with any of the functions and features described in conjunction with FIGS. 1-28. In step 440, touch data is processed to determine a bias corresponding to the user interaction with the virtual joystick. In step 442, bias compensated joystick data is generated based on the user interaction with the virtual joystick.

While the description above has set forth several different modes of operation, the devices described here may simultaneously be in two or more of these modes, unless, by their nature, these modes necessarily cannot be implemented simultaneously. While the foregoing description includes the description of many different embodiments and implementations, the functions and features of these implementations and embodiments can be combined in additional embodiments of the present invention not expressly disclosed by any single implementation or embodiment, yet nevertheless understood by one skilled in the art when presented this disclosure.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.35 micron or smaller CMOS technology and can include one or more system on a chip integrated circuits that implement any combination of the devices, modules, submodules and other functional components presented herein. Provided however that other circuit technologies including other transistor, diode and resistive logic, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment. Various embodiments of the present invention herein-described have features that distinguish the present invention from the prior art. It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A method for use in conjunction with a handheld device that includes a touch screen, the method comprising:
generating joystick display data for display on the touch screen, wherein the joystick display data creates a visual representation of a virtual joystick when displayed on the touch screen, wherein the visual representation of the virtual joystick includes a boundary and an actuator that moves within the boundary;
processing touch data from the touch screen to determine when the touch data indicates user interaction with the virtual joystick, by:

determining the touch data indicates user interaction with the virtual joystick when the touch data corresponds to a touch of the touch screen inside the boundary; and when the touch data indicates user interaction with the virtual joystick:
  adjusting the joystick display data to reflect the user interaction with the virtual joystick, based on the touch data by modifying a position of the actuator to correspond to a position of the touch of the touch screen;
  generating joystick data based on the user interaction with the virtual joystick, wherein display of a game object of a game on the touch screen is controlled based on the joystick data wherein generating the joystick data based on the user interaction with the virtual joystick includes:
    generating orientation data that indicates an orientation of the virtual joystick;
    comparing the orientation indicated by the orientation data to a nonlinear capture function that includes a range of orientations about a plurality of advantageous orientations that are advantageous to operation of the game;
    generating the joystick data to indicate a selected one of the plurality of advantageous orientations when the orientation data compares favorably to the range of orientations corresponding to the selected one of the plurality of advantageous orientations;
    generating the joystick data to indicate the orientation indicated by the orientation data when the orientation data compares favorably to another range of orientations, distinct from the range of orientations corresponding to the plurality of advantageous orientations; and
    generating the joystick data to indicate a null orientation when the orientation data compares favorably to at least one null range of orientations, distinct from the range of orientations corresponding to the plurality of advantageous orientations and the another range of orientations, wherein the range of orientations about the plurality of advantageous orientations together with the another range of orientations and the at least one null range of orientations correspond to a full 360 degree range of possible orientations of the joystick data.

2. The method of claim 1 wherein display of the game object on the touch screen is controlled to indicate a first mode of motion when the orientation data compares favorably to the range of orientations corresponding to the selected one of the plurality of advantageous orientations; and
  wherein display of the game object on the touch screen is controlled to indicate a second mode of motion when the orientation data compares favorably to the another range of orientations.

3. The method of claim 1 further comprising:
  determining the touch data indicates user interaction with the virtual joystick when the touch data corresponds to dragging the touch from inside the boundary to outside the boundary, wherein the boundary maintains a fixed position on the display screen;
  wherein the joystick display data includes an indication of the boundary at the fixed position and the joystick display data maintains an actuator position within the boundary regardless of when the touch data corresponds to dragging the touch from inside the boundary to outside the boundary.

4. The method of claim 1 further comprising:
  displaying visual orientation feedback on the touch screen, based on the joystick data, wherein the visual orientation feedback includes an orientation object that visually indicates an orientation selected by the virtual joystick, and wherein the object is separate from the visual representation of the virtual joystick and is separate from the game object, but displayed in conjunction with an axis centered on the game object.

5. The method of claim 4 wherein the game object is displayed at the selected one of the plurality of advantageous orientations and the visual orientation feedback is displayed at the orientation indicated by the orientation data.

6. The method of claim 1 further comprising:
  generating instruction data for display on the touch screen, wherein the instruction data generates a display of a visual prompt on the touch screen that instructs the user on use of the virtual joystick.

7. The method of claim 6 further comprising:
  terminating the display of the visual prompt when the touch data indicates user interaction with the virtual joystick.

8. The method of claim 1 wherein generating joystick display data for display on the touch screen includes modifying a position of the virtual joystick on the touch screen in response to a user selection of the position of the virtual joystick.

9. The method of claim 1 further comprising:
  processing the touch data to determine a bias corresponding to the user interaction with the virtual joystick;
  wherein generating the joystick data based on the user interaction with the virtual joystick includes bias compensation.

10. The method of claim 1 wherein the virtual joystick includes at least one adjunct button that is selectable in response to user interaction;
  wherein processing the touch data further includes determining when the at least one adjunct button is selected; and
  wherein generating the joystick data includes generating button selection data when the at least one adjunct button is selected.

11. A method for use in conjunction with an electronic device that includes a touch screen, the method comprising:
  generating joystick display data for display on the touch screen, wherein the joystick display data creates a visual representation of a virtual joystick when displayed on the touch screen;
  processing touch data from the touch screen to determine when the touch data indicates user interaction with the virtual joystick, and when the touch data indicates user interaction with the virtual joystick:
    adjusting the joystick display data to reflect the user interaction with the virtual joystick, based on the touch data, wherein the joystick display data includes an indication of a boundary at a fixed position and the joystick display data maintains an actuator position within the boundary regardless of when the touch data corresponds to dragging the touch from inside the boundary to outside the boundary, and wherein the boundary maintains a fixed position on the display screen; and
    generating joystick data based on the user interaction with the virtual joystick, wherein display of a game object of a game on the touch screen is adjusted based on the joystick data, wherein generating the joystick data based on the user interaction with the virtual joystick includes:
- generating orientation data that indicates an orientation of the virtual joystick;
- comparing the orientation indicated by the orientation data to a nonlinear capture function that includes a range of orientations about a plurality of advantageous orientations that are advantageous to operation of the game;
- generating the joystick data to indicate a selected one of the plurality of advantageous orientations when the orientation data compares favorably to the range of orientations corresponding to the selected one of the plurality of advantageous orientations;
- generating the joystick data to indicate the orientation indicated by the orientation data when the orientation data compares favorably to another range of orientations, distinct from the range of orientations corresponding to the plurality of advantageous orientations;
- generating the joystick data to indicate a null orientation when the orientation data compares favorably to at least one null range of orientations, distinct from the range of orientations corresponding to the plurality of advantageous orientations and the another range of orientations, wherein the range of orientations about the plurality of advantageous orientations together with the another range of orientations and the at least one null range of orientations correspond to a full 360 degree range of possible orientations of the joystick data.

12. The method of claim 11 wherein the visual representation of the virtual joystick includes a boundary and wherein processing touch data from the touch screen to determine when the touch data indicates user interaction with the virtual joystick includes determining when the touch data corresponds to a touch of the touch screen inside the boundary.

13. The method of claim 11 wherein processing touch data from the touch screen to determine when the touch data indicates user interaction with the virtual joystick includes determining when the touch data corresponds to a touch of the touch screen inside the boundary and further corresponds to dragging the touch outside the boundary.

14. The method of claim 11 wherein the visual representation of the virtual joystick includes an actuator and wherein adjusting the joystick display data to reflect the user interaction with the virtual joystick includes modifying a position of the actuator to correspond to a position of a touch of the touch screen.

15. The method of claim 11 wherein display of the game object on the touch screen is controlled to indicate a first mode of motion when the orientation data compares favorably to the range of orientations corresponding to the selected one of the plurality of advantageous orientations; and
- wherein display of the game object on the touch screen is controlled to indicate a second mode of motion when the orientation data compares favorably to the another range of orientations.

16. The method of claim 15 wherein the game object is displayed at the selected one of the plurality of advantageous orientations and visual orientation feedback is displayed at the orientation indicated by the orientation data.

17. The method of claim 11 further comprising:
- processing the touch data to determine a bias corresponding to the user interaction with the virtual joystick;
- wherein generating the joystick data based on the user interaction with the virtual joystick includes bias compensation.

18. The method of claim 17 wherein the processing the touch data to determine the bias includes determining a difference between at least two touch positions indicated by the touch data.

19. The method of claim 11 wherein the joystick display data creates a visual representation of a plurality of virtual joysticks.

20. The method of claim 11 wherein adjusting the display of the game object includes moving a background.

* * * * *